(12) United States Patent
Harper et al.

(10) Patent No.: US 11,593,580 B1
(45) Date of Patent: Feb. 28, 2023

(54) SECURING PRIVATE INFORMATION USING TWO-DIMENSIONAL BARCODES

(71) Applicants: Arlon Blaine Harper, Houston, TX (US); Chase Joshua Harper, League City, TX (US)

(72) Inventors: Arlon Blaine Harper, Houston, TX (US); Chase Joshua Harper, League City, TX (US)

( * ) Notice: Subject to any disclaimer, the term of this patent is extended or adjusted under 35 U.S.C. 154(b) by 12 days.

(21) Appl. No.: 17/517,837

(22) Filed: Nov. 3, 2021

(51) Int. Cl.
| | |
|---|---|
| G06K 7/14 | (2006.01) |
| H04L 9/06 | (2006.01) |
| G06F 21/62 | (2013.01) |
| G06K 1/12 | (2006.01) |
| G06K 19/06 | (2006.01) |

(52) U.S. Cl.
CPC .......... *G06K 7/1417* (2013.01); *G06F 21/62* (2013.01); *G06F 21/6245* (2013.01); *G06K 1/121* (2013.01); *G06K 19/06037* (2013.01); *H04L 9/06* (2013.01); *G06F 2221/2143* (2013.01); *H04L 2209/34* (2013.01)

(58) Field of Classification Search
CPC .............. G06K 7/1417; G06K 1/121; G06K 19/06037; G06F 21/62; G06F 21/6245; G06F 2221/2143
USPC ........................................................ 235/494
See application file for complete search history.

(56) References Cited

U.S. PATENT DOCUMENTS

2008/0000981 A1* 1/2008 Niwa ............... G06K 19/06009
235/462.01

* cited by examiner

*Primary Examiner* — Jamara A Franklin
(74) *Attorney, Agent, or Firm* — Jeffrey Streets; Madan Law PLLC

(57) ABSTRACT

A computer program product includes a non-volatile computer readable medium and non-transitory program instructions embodied therein, the program instructions being configured to be executable by a processor to cause the processor to perform various operations. The operations may include obtaining first encoded data that encodes information of a first party, obtaining second encoded data that encodes information of a second party, performing a forward mashup algorithm on the first encoded data and second encoded data to form a third data set, and providing the third data set to the first party as a mashup two-dimensional barcode.

32 Claims, 13 Drawing Sheets

CREDIT CARD TRANSACTION

| | Customer (P1) | Retailer (P4) | Bank (P2) | Service Provider (P3) |
|---|---|---|---|---|
| $t_1$ | Bank Account Information →<br>Stores Encoded Bank Account Data ← | | | → Encodes Bank Account Information<br>— Encoded Bank Account Information |
| $t_2$ | | Bank Encoded Data ← | Bank Information →<br>— Bank Encoded Data ← | Encodes Bank Information |
| $t_3$ | Encoded Bank Account Information →<br><br>Credit / Debit card ← | | Encoded Bank Information →<br><br>— Mashup Code ← | → Encoded Bank Account Information<br>→ Encoded Bank Information<br>Calculates Mashup of Bank Info and Account Info using Forward Mashup Algorithm |
| $t_4$ | Credit / Debit card →<br><br>Complete transaction ← | Scan Debit / Credit card<br>Bank Encoded Data →<br>— Display transaction Details ← | — Request Transaction ← | Mashup code and Request Bank Encoded Data<br>Calculate Bank account Information using Mashup code and Bank Information |

SECURING PRIVATE INFORMATION USING TWO-DIMENSIONAL BARCODES

BACKGROUND

The present disclosure relates to the use of two-dimensional barcodes to provide access to specific information.

BACKGROUND OF THE RELATED ART

A barcode is a machine-readable optical label that contains information. For example, the information may be related to an item to which the barcode is attached. A first generation of barcodes, referred to as linear barcodes or one-dimensional barcodes, represented data by varying the widths and spacing of parallel lines. Such linear barcodes may be read quickly using a special optical scanner referred to as a barcode reader. A second generation of barcodes includes a Quick Response (QR) code, which is a type of matrix barcode or two-dimensional barcode. Each QR code includes black dots or squares arranged in a square grid on a white background. Three dimensional barcodes have been developed, such as using four or eight basic colors of each dot or square to add a third dimension to an otherwise two-dimensional barcode. However, such three-dimensional barcodes are not yet in wide use.

Data is encoded into the QR code by the patterns of black and white areas in both the horizontal and vertical components of the image. Furthermore, a two-dimensional barcode, such as a QR code, can storage more data than a one-dimensional barcode. A QR code may use any of four standard encoding modes, including numeric, alphanumeric, byte/binary and kanji. The amount of data that can be stored in a QR code symbol varies among the encoding modes, as well as the version and level of error correction that are used. For example, a version 1 QR code has a 21×21 matrix and a version 2 QR code has a 25×25 matrix, whereas a version 40 WR code has a 177×177 matrix.

A QR Code is quickly readable using an imaging device such as a smartphone camera. A programmed processor analyzes the digital image obtain by the image sensor or camera. The processor may locate three distinctive squares at the corners of the QR code image and may use a smaller square (or multiple squares) near the fourth corner to normalize the image for size, orientation, and angle of viewing. The small dots throughout the QR code are then converted to binary numbers and validated with an error-correcting algorithm.

Both linear and matrix barcodes have found a wide variety of uses, including product tracking, item identification, document management, marketing, and quick entry of a uniform resource locator (URL) data. In fact, some matrix barcodes now include a frame and call-to-action designation or icon to convey to a person what action will be taken upon scanning of the barcode.

BRIEF SUMMARY

Some embodiments provide a computer program product comprising a non-volatile computer readable medium and non-transitory program instructions embodied therein, the program instructions being configured to be executable by a processor to cause the processor to perform various operations. The operations may include obtaining first encoded data that encodes information of a first party, obtaining second encoded data that encodes information of a second party, performing a forward mashup algorithm on the first encoded data and second encoded data to form a third data set, and providing the third data set to the first party as a mashup two-dimensional barcode.

Some embodiments provide an apparatus comprising at least one non-volatile storage device storing program instructions and at least one processor configured to process the program instructions, wherein the program instructions are configured to, when processed by the at least one processor, cause the apparatus to perform various operations. The operations may include obtaining first encoded data that encodes information of a first party, obtaining second encoded data that encodes information of a second party, performing a forward mashup algorithm on the first encoded data and second encoded data to form a third data set, and providing the third data set to the first party as a mashup two-dimensional barcode.

BRIEF DESCRIPTION OF THE SEVERAL VIEWS OF THE DRAWINGS

FIG. 12 is a process diagram illustrating a credit card transaction.

DETAILED DESCRIPTION

Figure 1A:
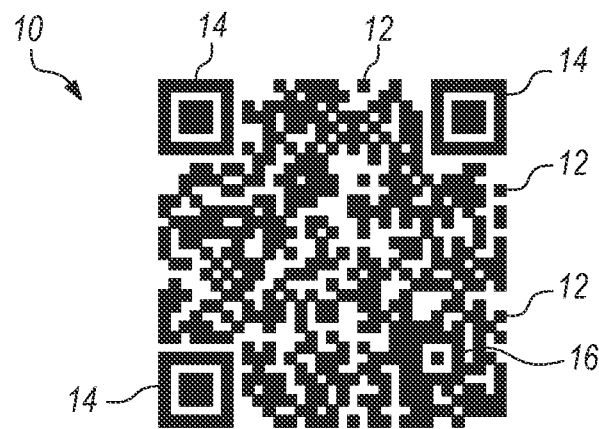
FIGS. 1A-B are diagrams of a prior art QR code (two-dimensional barcode) and a smartphone scanning and decoding the QR code to display a menu.

Some embodiments provide a computer program product comprising a non-volatile computer readable medium and non-transitory program instructions embodied therein, the program instructions being configured to be executable by a processor to cause the processor to perform various operations. The operations may include obtaining first encoded data that encodes information of a first party, obtaining second encoded data that encodes information of a second party, performing a forward mashup algorithm on the first encoded data and second encoded data to form a third data set, and providing the third data set to the first party as a mashup two-dimensional barcode.

The first and second encoded data may be encoded in various manners and do not need to be encoded in the same manner. For example, the first encoded data may be encoded in a first manner or using a first encoding algorithm, and the second encoded data may be encoded in a second manner or using a second encoding algorithm. However, encoded data requires some extent of repeatable or rules-based formatting or organization to the data. Furthermore, encoded data must be capable of being decoded to gain access to the data that was encoded. For example, raw information, such as a person's name or a website's uniform resource locator (URL), may be encoded according to a two-dimensional barcode standard or specification. In fact, there are several different encoding modes for two-dimensional barcodes. In one non-limiting example, encoded data may include encoding information in addition to the raw information. The encoding information may specify, without requirement or limitation, an encoding mode, an error correction level, mask pattern, message length, bit order and/or message (raw information) placement. Furthermore, the message (raw information) portion of the encoded data may itself be encoded, such as using the American Standard Code for information Interchange (ASCII) character encoding standard to encode text.

The first encoded data encodes information of a first party and the second encoded data encodes information of a second party. The type and content of the information that each party provides for encoding may vary widely and does not affect the utility of the embodiments. For example, the raw information may include fixed content, such as alphanumeric text, an image, audio and/or video, or may include dynamic content, such as a bank account information, real time data, global positioning system (GPS) data, and/or stock numbers. Optionally, the raw information may be truncated or compressed so that the encoded data obtained by encoding the raw information does not exceed the data storage capacity of the two-dimensional barcode datatype, version and error correction that is being used. On the other hand, the raw information may be expanded or repeated so that the two-dimensional barcode does not require filler or long strings of repeating digits or repeating patterns of digits. However, embodiments may be used to secure access to the information of one or more party, so such information may often be private information. Any such private information may be personal information that is not generally available to the public or may be secret information. For example, information of the first party may include a person's name, identification number, address, description and/or an image of the person's face. Such information may not be generally publicly available but is not considered to be secret since many other individuals may know and recognize the person. By contrast, a person's password to an online account or application program may in fact be secret. Private and/or secret information may be encoded according to various embodiments.

In some embodiments, the raw information may be encoded using one or more encoding standards or protocols, such a character encoding standard, an image file format, a video coding format, and/or an audio coding format. Some of these standard and formats may be used with or without compression. One suitable character encoding standard is the American Standard Code for Information Interchange (ASCII) that represents text in computers and telecommunications equipment. Similarly, a suitable image coding format may be selected from Joint Photographic Experts Group (JPEG) format, Tagged Image File Format (TIFF), Graphics Interchange Format (GIF) and other formats. Suitable audio coding formats may be selected from Waveform Audio File Format (WAV) and Moving Picture Experts Group (MPEG). Furthermore, the encoded raw information may be included in a data portion of a QR code that further includes format information as would be used in the generation of a QR code. For example, the format information may include encoding mode indication, message length, error correction level, mask pattern, and the like.

In some embodiments, the first and second parties may each be independently selected from an individual person, a group or association of people, an entity such as a corporation or governmental body, a facility, and the like. In some options, one party may be an individual and the other party may be an entity. In any case, the raw information or source information of each party that is encoded may vary in type and/or content. The raw information may be a name, address, logo, description, and the like.

In some embodiments, the forward mashup algorithm is an additive encryption process that uses both the first encoded data and the second encoded data to produce the third data set. Any one or all of the first encoded data, second encoded data and third data set may be represented by a two-dimensional barcode, such as a QR code. A two-dimensional barcode produced by the forward mashup algorithm may be referred to as a "mashup two-dimensional barcode" or simply "mashup barcode", such as a "mashup QR code." In one non-limiting example, the mashup algorithm may involve one or more Boolean operation applied to the first and second encoded data. The mashup two-dimensional barcode is itself inoperative in the sense that the mashup two-dimensional barcode does not independently represent useful information. Rather, the value and importance of the mashup two-dimensional barcode is that it serves as a key which, when combined with one of the operand two-dimensional barcodes that was used by the forward mashup algorithm to form the mashup barcode, may be used by a reverse mashup algorithm to yield the other operand barcode. Once the other operand barcode, or its underlying encoded data, is obtained by the reverse mashup algorithm, the underlying information may be decoded. In some embodiments, the other operand barcode may be decoded to yield private information.

In some embodiments, one of the barcodes that is input as an operand to the forward mashup algorithm may be publicly available. A public barcode may or may not include data encoded from information about one of the parties to a relationship. Accordingly, scanning a public barcode may or may not yield useful data such as party's identity, contact information, location, website, etc. Optionally, a public barcode may be associated with a company or other entity. A barcode may be made "public" by posting the barcode on a public network such as the Internet or by posting a printed copy of the barcode in any number of public locations. In one specific and non-limiting example, an airport or airline may publicly post their barcode (optical images) as printed signs or images displayed on a display screen. In one option, a printed sign may be secured to a wall or counter.

In some embodiments, a mashup barcode may be securely used in public without risking disclosure of the underlying information. For example, a mashup QR code may form an optical image, such as being physically displayed on an object (i.e., printed) or electronically output on a display screen. For example, the mashup barcode may be printed or otherwise appear on an employee identification badge, a ticket for transportation or special event, a credit or debit card, advertisements, a communication network access token or display screen, and the like.

In some embodiments, an image of a two-dimensional barcode may be read, captured or otherwise input to a computing device using an imaging device, such as a digital camera or digital scanner. The resulting digital data file obtained in this manner may be stored in various formats, such as a mere digital photograph or as a data structure consistent with a particular QR encoding mode and/or version. Similarly, an image of a two-dimensional barcode, including a first party barcode, second party barcode and mashup barcode, may be printed, displayed, or otherwise output using various output devices, such as a printer, display screen, or image projector.

In some embodiments, the forward and reverse mashup algorithms may be performed on the encoded data that represents the optical image of the two-dimensional barcode, rather than attempting to mashup the actual optical images of the barcode. Accordingly, where one of the two-dimensional barcodes is provided in the form of an optical image that is visible to a human eye and scanned by a camera or other imaging device, the optical image of the barcode may be scanned to obtain the associated encoded data prior to performing the forward or reverse mashup algorithm. Furthermore, encoded data that is output by the forward or reverse mashup algorithms may be output as an optical image for some applications, whereas encoded data that is output by the forward or reverse mashup algorithms may be directly used in a decoding process to obtain the underlying raw information in some other applications.

Some embodiments may be described as involving various individuals and/or entities, such as a first party, a second party and a service provider. However, embodiments may also be described as including a system that includes various computing devices, such as a first party computing device, a second party computing device and a service provider computing device. Furthermore, embodiments may be described as including various application programs, such as a mobile application, desktop application and/or web application. It should be recognized that the application programs may be executed on the various computing devices, and that the various computing device may be operated and/or owned by the various individuals and/or entities. Accordingly, discussions herein should be considered in context and understood that any reference to an application and/or computing device as belong to a particular individual and/or entity is merely an example of who might use the application and/or computing device, and that any reference to an individual and/or entity may involve the use of a computing device and/or an application unless the context of the discussion clear refers to the individual person and/or entity. In one example, the processor that executes the program instructions is included in a computing device, such as web application server or cloud environment. Alternatively, the processor that executes the program instructions may be included in a computing device, such as a smartphone, laptop computer, or desktop computer. Furthermore, some embodiments will include multiple computing devices that each execute certain program instructions to perform operations on behalf of one party or another, such as the first party, the second party, the service provider, or others. Some embodiments may involve additional parties, and their associated computing devices and applications, even if the first and second parties are the only parties associated with a two-dimensional barcode.

In some embodiments, the operations may further include receiving, subsequent to providing the third data set to the first party as the mashup two-dimensional barcode, the third data set from a computing device operated by the second party. While the third data set and/or the mashup two-dimensional barcode is initially provided to the first party, the first party may provide the third data set and/or the mashup two-dimensional barcode to the second party as a step in an interactive process, such as the first party attempting to gain access to an employer's (second party) facility. As a result, the service provider computing system may be receiving the third data set from the second party. The operations may then further include performing a reverse mashup algorithm on the third data set and the second encoded data to determine the first encoded data, decoding the first encoded data to produce private information of the first party, and outputting the private information of the first party to the computing device of the second party. Continuing the previous example, the employer computing system may determine the first encoded data, produce the private information of the first party such as a name, image or other identifier, and then output that private information on a display such that security personnel can verify the identity of the first party.

In some embodiments, the forward mashup algorithm is a first Boolean operation and the reverse mashup algorithm is a second Boolean operation. Optionally, the forward and reverse mashup algorithms may each involve one or more Boolean algebraic function or one or more truth table. For example, the forward mashup algorithm may be a Boolean addition algorithm. Such a Boolean additional algorithm may use Boolean operators on first and second strings of binary digits using basic functions, such as string indexing and slicing, to compare two inputs and give a Boolean output. For example, the Boolean addition algorithm may operate in a step-wise, bit-by-bit sequence, that applies the Boolean operator to bits read from the same position (i.e., row and column) in the operand two-dimensional barcodes. The digital output of the Boolean operation may be represented as white and black squares or dots (i.e., perhaps white=0 and black=1, or vice versa as predetermined) that will form the mashup two-dimensional barcode. The order or type of Boolean operation used in the forward mashup algorithm may include any single or combination of Boolean operators or logic so long as a reverse Boolean operation can be provided for use in the reverse mashup algorithm to definitively obtain the information underlying one or both of the operand two-dimensional barcodes. The type of operators may be AND, XOR, OR, and NOT, without limitation, but one or more selections and combinations of these operators can create different Boolean operations for use as the forward and/or reverse mashup algorithms.

In one specific embodiment, the operations may further include providing an image of the mashup two-dimensional barcode by printing the mashup two-dimensional barcode on identification card or badge to be given to the first party. Accordingly, the first party may wear or carry the identification card with them, where the encoded data within or underlying the mashup barcode can be decoded to obtain the first party's private information if processed in combination with the required second party encoded data by the reverse mashup algorithm (i.e., the reverse of the forward mashup algorithm that was used to generate the mashup barcode). Still, it should be appreciated that the first party's private information is not actually displayed on the identification card and, therefore, the private information cannot be obtained by simply viewing the identification card. Rather, the operations may further include receiving an image of the mashup two-dimensional barcode that is printed on the identification card or badge from the computing device of the second party, and decoding the third data set from the mashup two-dimensional barcode. In one option, the image of the mashup two-dimensional barcode that is printed on the identification card or badge is received from the computing device of the second party. For example, the processor that is performing the operations may be included in a computing device of the second party, wherein the computing device of the second party receives the image of the mashup two-dimensional barcode from a digital camera directly attached to the computing device of the second party, and wherein the private information of the first party is then output to a display screen directly attached to the computing device of the second party.

In some embodiments, the security of the first party's private information is increased because the private information does not need to be stored on any party's computing device after the mashup barcode has been generated. Specifically, the operations may further include confirming that the computing device of the first party has received the mashup two-dimensional barcode, and deleting any record of the private information of the first party and the first encoded data from memory or data storage attached to the processor. In other words, embodiments allow the service provider computing device to provide a forward mashup algorithm service and a reverse mashup algorithm service without the responsibility and/or liability of storing private information belonging to other parties. Of course, nothing about the embodiments prohibits the storage of the private information on any of the computing devices. For example, if the forward and/or reverse mashup algorithms are performed on the first party's computing device, then perhaps the first party computing device will still store the private information. However, in the later situation, at the least the first party maintains control over their own private information and can protect it in any manner they determine is appropriate. However, a third party, such as the service provider, that stores the first party's private information after generating the mashup barcode or after decoding the private information may be subject to liability for breaching a duty of care to protect that information if it is stolen.

In some embodiments, the forward mashup algorithm performs a bit-wise sequential Boolean operation on the first encoded data and the second encoded data. Optionally, the first encoded data may include a first plurality of bits, wherein each bit of the first plurality of bits is associated with a defined position within a first two-dimensional barcode to be formed from the first encoded data. Similarly, the second encoded data may include a second plurality of data bits, wherein each bit of the second plurality is associated with a defined position within a second two-dimensional barcode to be formed from the second encoded data. The bit-wise sequential Boolean operation may then include, for each of the defined positions within the two-dimensional barcodes, a Boolean operation performed on the bit of the first encoded data that is associated with the defined position and the bit of the second encoded data that is associated with the defined position. One non-limiting example of the Boolean operation performed by the forward mashup algorithm may be a logical AND operation. Furthermore, for each of the plurality of bits in the first encoded data, the value of the bit may determine whether a black or white area is provided at the defined position associated with the bit. Black and white areas are the most practical and yield a good contrast, but other colors may be used as well. In one option, the first and second two-dimensional barcodes may include defined positions that are arranged in columns and rows. Still further, the operations may further include identifying one or more orientation feature within the image of the first two-dimensional barcode that indicates an orientation of the first two-dimensional barcode and identifying one or more orientation feature within the image of the second two-dimensional barcode that indicates an orientation of the second two-dimensional barcode. The defined positions within the first and second two-dimensional barcodes may then be identified relative to the one or more orientation features.

Some embodiments provide an apparatus comprising at least one non-volatile storage device storing program instructions and at least one processor configured to process the program instructions, wherein the program instructions are configured to, when processed by the at least one processor, cause the apparatus to perform various operations. The operations may include obtaining first encoded data that encodes information of a first party, obtaining second encoded data that encodes information of a second party, performing a forward mashup algorithm on the first encoded data and second encoded data to form a third data set, and providing the third data set to the first party as a mashup two-dimensional barcode.

In some embodiments, the application programs, or simply "applications," that are run on any one of the computing devices may include one or more unique functionalities or may be entirely the same full-featured application, perhaps subject to customization using various settings to cause the application to perform as necessary for a given party and embodiment. Similarly, the computing devices may each include one or more unique hardware components or may have entirely the same architecture and/or component configurations. Furthermore, each party may form an account with the service provider, such that use of the software application to obtain the services of the service provider may require the party to authentication themselves to the application or service provider, such as by entering an account login and password.

In some embodiments, the forward mashup algorithm may be a private algorithm, such as a forward mashup algorithm that is secured and performed by only one entity, such as a remote service provider or one of the first or second parties. Furthermore, a service provider may offer multiple paired forward and reverse algorithms, such that one or the parties may select one of the available forward and reverse algorithm pairs. Accordingly, the variability of the selected algorithm pair may further complicate any third-party attempt to obtain the private information from the mashup barcode.

In some embodiments, the functions and communications attributed to the service provider may be performed by one of the first and second parties. In one specific example, the functions and communications of the service provider and the functions and communications of the second party may be combined and performed by a single entity using a computing device or system under that entity's control. Accordingly, rather than using a service provider, the second party may perform the encoding/decoding functions for themselves, and the second party may control and perform the forward and reverse mashup algorithms for themselves.

In embodiments that combine the functionality of the service provide with the second party, the mashup QR codes are still not meaningful to a third-party observer without access to the reverse mashup algorithm and the second party QR code.

In some embodiments, the mashup two-dimensional barcode may be provided along with an image, such as an artistic embellishment or a brand logo. For example, such image may be placed in an unused area of the barcode or may be implemented in a manner that error correction code will still correctly read the barcode despite the presence of the image. In other words, the image may be formed by intentionally introducing errors into the two-dimensional barcode with knowledge that the error correction can remove the errors.

In some embodiments, a plurality of first parties may provide their individual raw information to be encoded and processed by a forward mashup algorithm along with encoded data representing a particular second party to form a mashup barcode that is unique to the particular first party. Accordingly, each individual first party may subsequently present their unique mashup barcode to the second party, or otherwise in association with the second party barcode, to enable access to the individual first party's raw information.

In some embodiments, the system or computer program product may be enabled to perform both the "reverse" mashup algorithm and the "forward" mashup algorithm, and may determine which algorithm is necessary for a given situation. In one example, either the first party or the second party may provide an indication/instruction to the service provider. Such indication or instructions may be input through a user interface on a computing device operated by the first party or second party, respectively. The same user interface may be used to collect and/or submit one or more of the two-dimensional barcode and/or encoded data for processing with the indicated forward or reverse mashup algorithm. For example, the distinction will be made through either party's 'request' to start the process, such as by pressing a consent button displayed after the party creates their account or attempts to read the mashup code which will direct the process in the right direction. Alternatively, the first party and/or the second party may provide input via their user interface to indicate whether to (a) generate a new mashup code or (b) decode an existing mashup code. In a further option, a two-dimensional barcode or encoded data may include a dedicated "mashup bit" that identifies whether a particular barcode or encoded data is a previously generated mashup code (i.e., mashup bit=1) or a barcode/data formed by encoding raw information (i.e., mashup bit=0). If a two-dimensional barcode is scanned that includes a mashup bit=1, then the reverse mashup algorithm should be used. If neither of the two-dimensional barcodes include a mashup bit=1, then the forward mashup algorithm should be used.

In some embodiments, the forward and/or reverse mashup algorithms may use a subset of the entire two-dimensional barcode, such as only that portion of the two-dimension barcode that represents the encoded data. For example, the orientation squares of a two-dimensional barcode may be used for their primary purpose of defining an orientation of the barcode, but then the mashup algorithms may ignore the orientation squares and/or other selected portions of the barcode. In an embodiment in which the mashup encoded data will not be physically generated in an optical layer, the mashup encoded data may completely exclude any encoding of the orientation squares. In a separate option, the forward and/or reverse mashup algorithms may ignore one or more areas of the two-dimensional barcode, or the associated fields of the encoded data, and simply process the remaining data. The technical benefit of using only a subset of the entire two-dimensional barcode in the forward and/or reverse mashup algorithms is that unproductive or wasteful processing may be reduced or avoided.

The foregoing computer program products may further include program instructions for implementing or initiating any one or more aspects of the methods described herein. Furthermore, the computer program product may be distributed among multiple computing devices of the same or different parties in order to carry out the methods and/or to implement the operations within a system including the computing devices of multiple parties. Similarly, the computing devices individually or collectively may include hardware and/or software components suitable to perform the program instructions of any of the computer program products or any one or more aspect of the methods described herein. Embodiments may also include methods of performing any one or more operations of the computer program products or the computing devices.

FIG. 1A is a diagram of a prior art two-dimensional barcode 10 in the form of a Quick Response (QR) code. The barcode 10 includes a two-dimensional matrix of square black dots 12 arranged in rows and columns on a white background. Areas where multiple consecutive black dots are displayed may appear as a thick line or area, but such areas are read as individual black dots. The barcode 10 further includes orientation squares, including large square features 14 in three corners, to enable a reader to identify a proper orientation of the barcode. The barcode 10 also include a normalization square 16 that may assist in determining an image size or angle of view.

Figure 1B:
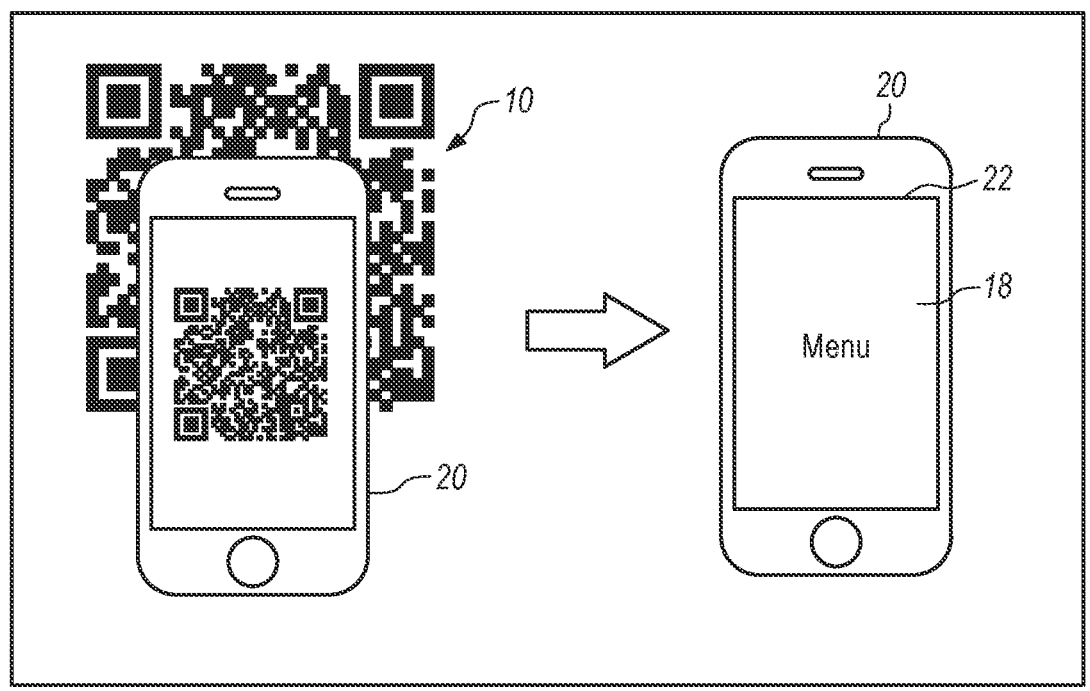

FIG. 1B is a diagram of a smartphone 20 scanning and decoding the barcode 10 to display a menu. The smartphone 20 includes a forward-facing camera (not shown) that is directed at the optical image of the two-dimensional barcode 10 and facilitates capturing of the barcode 10. The two-dimensional barcode 10 may then be analyzed, either by the smartphone 20 or a remote barcode reader service, to identify information that has been encoded and displayed as the two-dimensional barcode 10. In the illustrated example, the barcode 10 may contain a URL that directs a web browser application running on the smartphone 20 to a particular webpage for a restaurant menu 18 that is then displayed on a screen 22 of the smartphone 20.

Figure 2:
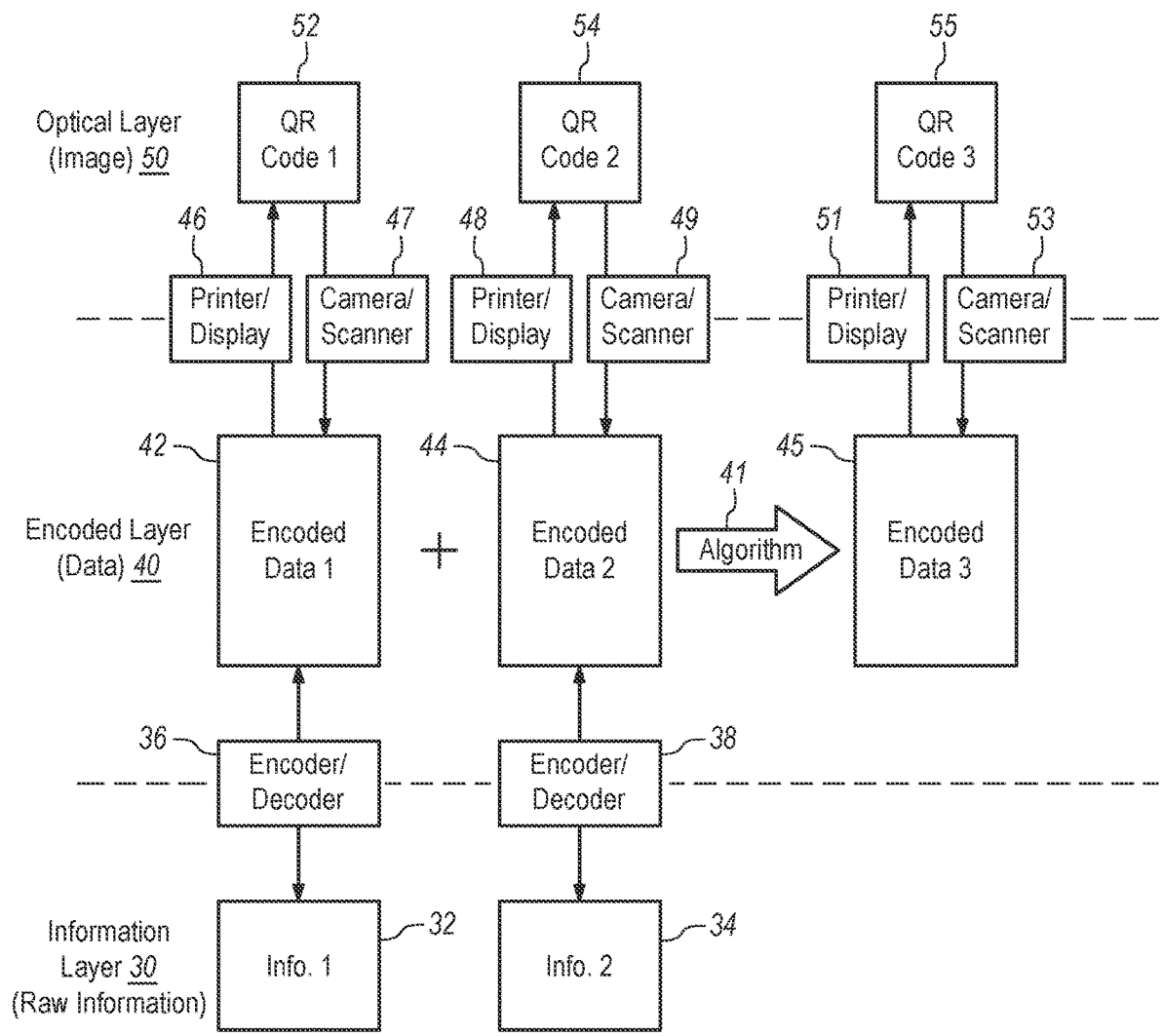
FIG. 2 is a conceptual diagram illustrating how data can be transformed between an information layer, an encoded data layer and an optical layer, and how encoded data in the encoded data layer may be processed using a forward mashup algorithm.

FIG. 2 is a conceptual diagram illustrating how data can be transformed between an information layer 30, an encoded data layer 40 and an optical layer 50, and how encoded data in the encoded data layer 40 may be processed using a forward mashup algorithm 41. The information layer 30 refers to raw information or source information that is directly understandable on its own. For example, first party information ("Info. 1") 32 may be a first individual person's name, address, identifier, image or other desired or useful information, such as a selected password. Similarly, second party information ("Info. 2") 34 may be a business' name, address, identifier, image or other desired or useful information, such as a selected password. An encoding function of an encoder/decoder 36, 38 is used to convert the raw information 32, 34 into encoded data 42, 44, respectively. Still further, a printer or display device 46, 48 may be used to form an optical image of the two-dimensional barcodes ("QR Code 1" and "QR Code 2") 52, 54, respectively. During some processes or embodiments, the optical images 52, 54 in the optical layer may be imaged by a camera or scanner 47, 49 to obtain or capture the associated or underlying encoded data. Note that vertical upward arrows illustrate that raw information in the information layer 30 may be encoded to form encoded data in the encoded layer 40, and encoded data in the encoded layer 40 may be printed or displayed to produce the QR code in the optical layer 50. Conversely, the vertical downward arrows illustrate that the QR code in the optical layer 50 may be imaged to obtain encoded data in the encoded layer 40, and encoded data in the encoded layer 40 may be decoded to obtain the raw information in the information layer 30.

A mashup algorithm, such as a Boolean logical operation, is represented by the arrow 41. The mashup algorithm 41 is able to process the two sets of encoded data 42, 44 and form a third data set of encoded data 45. In some embodiments, each encoded data set 42, 44 includes a string or sequence of binary digits (i.e., each digit has a value of either 0 or 1) and the mashup algorithm processes the binary digits in a bit-wise (bit-by-bit) manner, perhaps from the most significant bit (MSB) to least significant bit (LSB) or vice versa, using one bit from the first encoded data set 42 and one bit from the second encoded data set 44 into the Boolean operation to output one bit in the third encoded data set 45. Once the third encoded data set 45 is formed, it may optionally be output via the printer or display 51 to form the image of the QR code 55. In a later process, the same QR code 55 may be imaged via the camera or scanner 53 to obtain the third encoded data set 45. Because the third encoded data set 45 is a mashup of the first and second encoded data sets 42, 44, there is no raw information underlying the third encoded data set 45 and a hacker or third party is unable to extract raw information from the third encoded data set 45. Rather, the value in the third encoded data set 45 is that it can be used in a further process to yield either the first party information 32 using the second party encoded data 44 or to yield the second party information 34 using the first party encoded data 42. These later processes are described below in reference to FIGS. 3A-B.

Figure 3A:
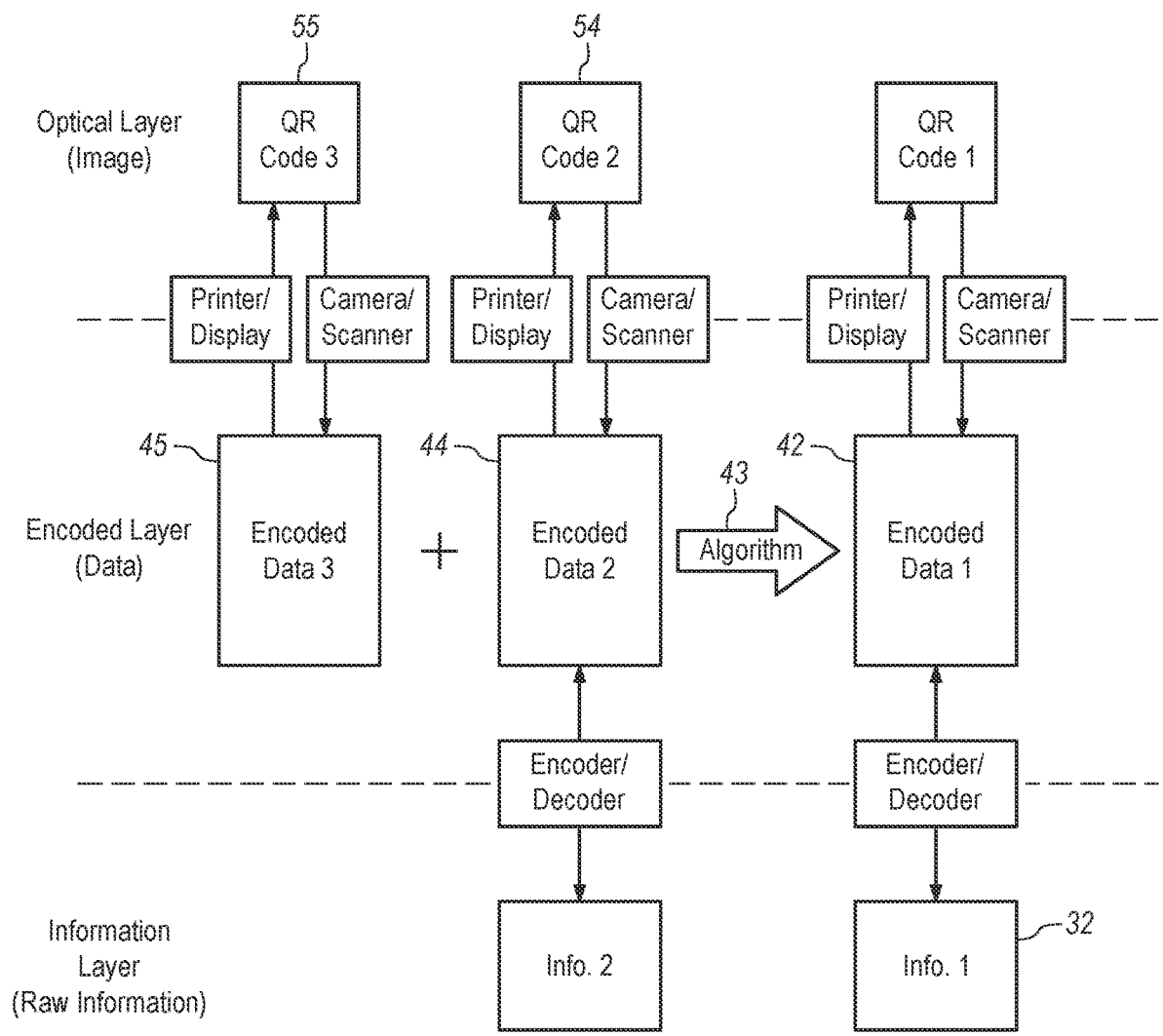
FIGS. 3A-B are conceptual diagrams illustrating how data can be transformed between an information layer, an encoded data layer and an optical layer, and how encoded data in the encoded data layer may be processed using a reverse mashup algorithm.
Figure 3B:
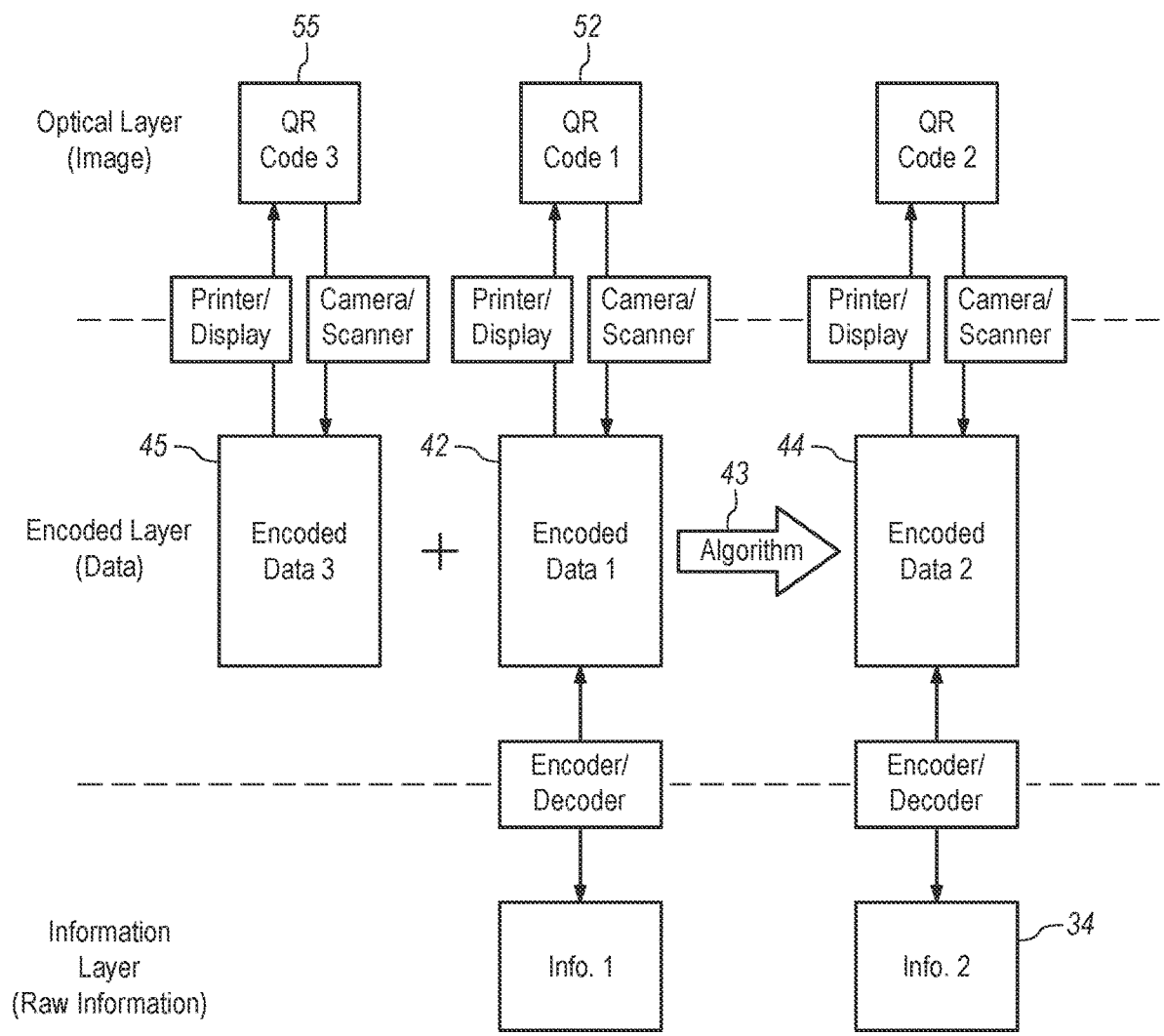

FIGS. 3A-B are conceptual diagrams illustrating how data can be transformed between the information layer 30, the encoded data layer 40 and the optical layer 50, and how encoded data in the encoded data layer 40 may be processed using a reverse mashup algorithm 43. In a simple example, the forward mashup algorithm 41 and the reverse mashup algorithm 43 are both a Boolean logical AND operation. However, other algorithms and operations may also be used. The same reference numbers are used in FIGS. 3A-B as in FIG. 2.

In FIG. 3A, the third encoded data 45 and the second encoded data 44 are processed by the reverse mashup algorithm 43 to yield the first encoded data 42. Depending upon the embodiment or implementation, the first encoded data 42 may be subsequently decoded to obtain the first information 32. Furthermore, either or both of the third encoded data 45 and the second encoded data 44 may be obtained by imaging the QR code 3 (55) or QR code 2 (54), respectively. Alternatively, either or both of the third encoded data 45 and the second encoded data 44 may be stored in a computer memory and merely submitted to the reverse mashup algorithm 43 without an imaging operation.

In FIG. 3B, the third encoded data 45 and the first encoded data 42 are processed by the reverse mashup algorithm 43 to yield the second encoded data 44. Depending upon the embodiment or implementation, the second encoded data 44 may be subsequently decoded to obtain the second information 34. Furthermore, either or both of the third encoded data 45 and the first encoded data 42 may be obtained by imaging the QR code 3 (55) or QR code 1 (52), respectively. Alternatively, either or both of the third encoded data 45 and the first encoded data 42 may be stored in a computer memory and merely submitted to the reverse mashup algorithm 43 without an imaging operation.

Figure 4A:
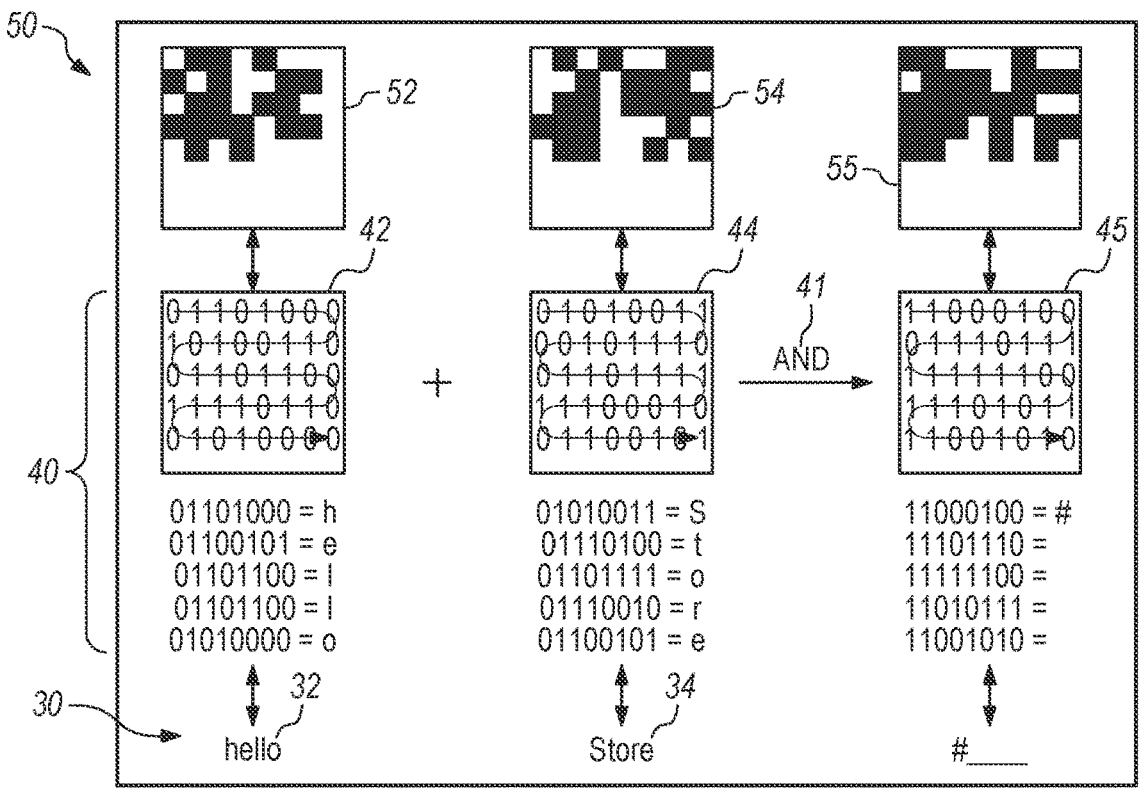
FIGS. 4A-B are diagrams showing a specific example of data being transformed between an information layer, an encoded data layer and an optical layer supporting use of a forward mashup algorithm in FIG. 4A and supporting use of a reverse mashup algorithm in FIG. 4B.
Figure 4B:
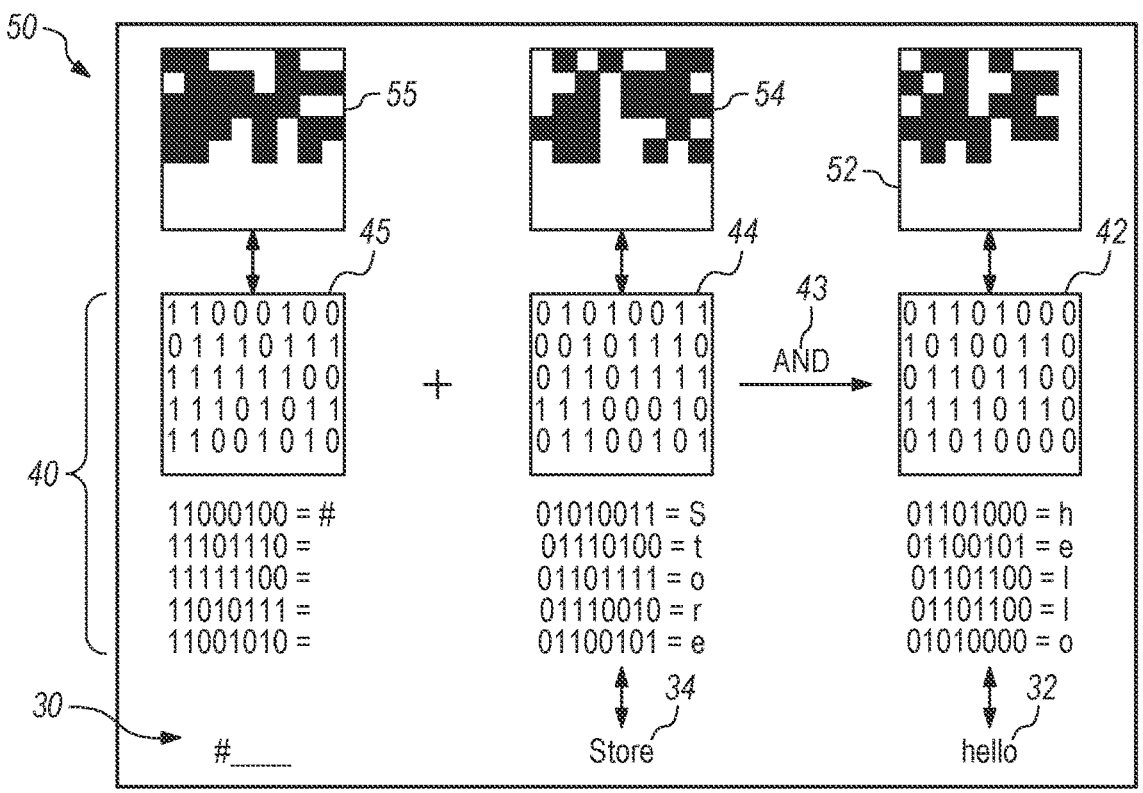

FIGS. 4A-B are diagrams showing a specific example of data being transformed between an information layer 30, an encoded data layer 40 and an optical layer 50 supporting use of a forward mashup algorithm 41 in FIG. 4A (similar to FIG. 2) and supporting use of a reverse mashup algorithm 43 in FIG. 4B (similar to FIG. 3A). However, these diagrams provide a simple example of actual information, one example of encoded data for the information, and one example of an image of a two-dimensional code that includes the encoded data.

The first party information 32 includes the text "hello." The first party information 32 may be encoded using ASCII encoding to encode each of the letters in the word "hello." Accordingly, the encoding is 01101000 01100101 01101100 01101100 0101000 in the encoded layer 40. However, the information may be further encoded consistent with a format or specification for a two-dimensional barcode. As illustrated, the ASCII binary code for "hello" is further transposed into encoded data 42 with a serpentine (left-to right; down-one-row; right-to-left; down-one row; repeat) path consistent with a hypothetic two-dimensional barcode standard. The encoded data 42 may be output in the optical layer 50 as an image of a two-dimensional barcode 52 in which each "0" from the encoded data 42 corresponds with a white dot and each "1" from the encoded data 42 corresponds with a black dot (or vice versa, according to a standard).

The second party information 34 includes the text "Store" and forms encoded data 44 using ASCII character encoding and the hypothetical two-dimensional code formatting standard described above. Such encoded data 44 may be output as the two-dimensional barcode 54. The forward mashup algorithm 41 performs a bit-by-bit, Boolean AND operation on the binary data in the encoded layer 40, where two individual bits having the same position in the first and second encoded data sets 42, 44 are the operands or inputs to the Boolean AND operation of the mashup algorithm 41 to determine a single bit for the same position in the third encoded data set 45. If desired, the mashup code 55 may be optically output. Note that barcode 55 does not bare any particular resemblance to the first and second barcodes 52, 54 and that the underlying "information" obtained by decoding the encoded data 45 is unintelligible, with only one part of the bit string actually encoding an "#" symbol according to the ASCII character coding standard.

FIG. 4B is a diagram using the same example as in FIG. 4A, but performing a reverse mashup algorithm 43 similar to that described in reference to FIG. 3A. Note that the two (third and second) barcodes 55, 54 may be imaged to obtain the encoded data 45, 44, respectively. Then, the reverse mashup algorithm 43 performs a bit-by-bit, Boolean AND operation on the binary data in the third and second encoded data 45, 44 to determine a single bit for the same position in the first encoded data set 42. Then, the first encoded data set 42 may be decoded to obtain the information 32 or message "hello". Note that the information 32 was obtainable from two barcodes 55, 54 using the reverse mashup algorithm 43, where neither of the two barcodes 55, 54 contained the information. Accordingly, it should be appreciated that the foregoing process was able to encode and protect the information 32 until such time and place that the two barcodes 55, 54 are presented for processing via the reverse mashup algorithm 43.

Figure 5:
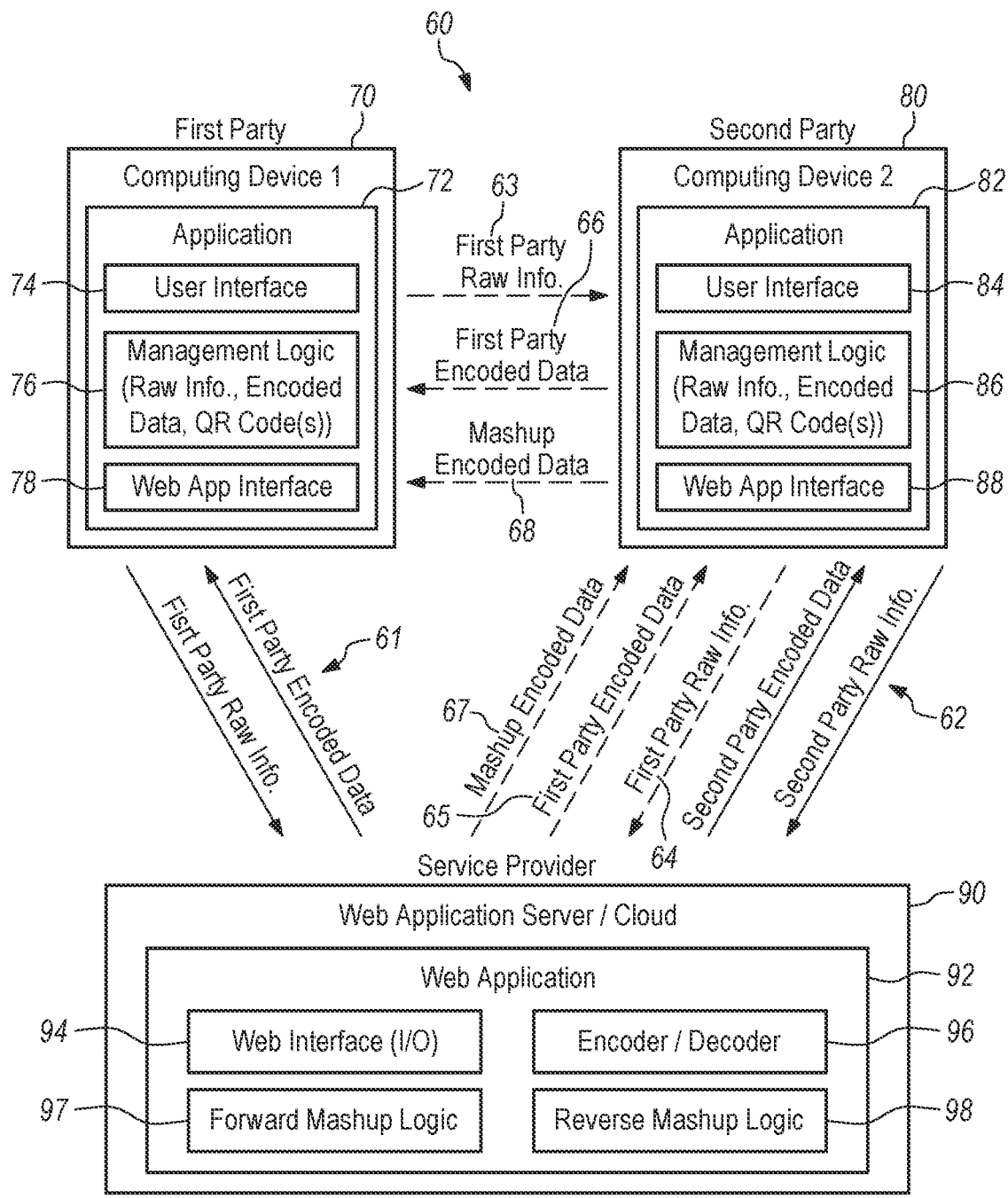
FIG. 5 is a diagram of a system in which a first party computing device, a second party computing device and a service provider web server or cloud are in communication to perform a process according to some embodiments.

FIG. 5 is a diagram of a system 60 in which a first party computing device 70, a second party computing device 80 and a service provider web server or cloud 90 are in communication to perform a process according to some embodiments. The first party computing device 70 performs an application 72 that causes the computing device to provide a user interface 74, such as a graphical user interface; management logic 76 for handling raw information, encoded data and optical two-dimensional barcodes; and a web application interface 78 for interfacing with the web application server or cloud 90 and the second party computing device 80. The second party computing device 70 may similarly perform an application 82 that causes the computing device to provide a user interface 84, such as a graphical user interface; management logic 86 for handling raw information, encoded data and optical two-dimensional barcodes; and a web application interface 88 for interfacing with the web application server or cloud 90 and the first party computing device 70.

The service provider web server or cloud 90 performs a web application 92 that causes the server or cloud device to provide a web interface 94; encoder/decoder logic 96; forward mashup algorithm logic 97, and reverse mashup algorithm logic 98. Other application modules may be included as desired to support the various embodiments, such as a user account module and the like.

FIG. 5 further illustrates some basic processes of some embodiments. Operations 61 show the first party device 70 submitting raw information to the web server 90 and the web server 90 returning first party encoded data to the first party computing device 70. Similarly, the operations 62 show the second party device 80 submitting raw information to the web server 90 and the web server 90 returning second party encoded data to the second party computing device 80. In one alternative, the operations 61 may be supplemented or supplanted by the first party device 70 providing raw information to the second party device 80 at operation 63, the second party device 80 providing the first party's raw information to the web server 90 at operation 64, the web server 90 returning first party encoded data to the second party device 80 at operation 65, and the second party device 80 transferring the first party encoded data to the first party computing device 70 at operation 66. While some of these operations are optional depending upon the embodiment, the web server 90 may obtain the first party encoded data and the second party encoded data and perform the forward mashup algorithm 97 before returning the first party mashup encoded data 67 to the second party device 80 for forwarding to the first party device at operation 68. Various embodiments involve the first party, second party and service provide interacting in various patterns at various times.

Figure 6:
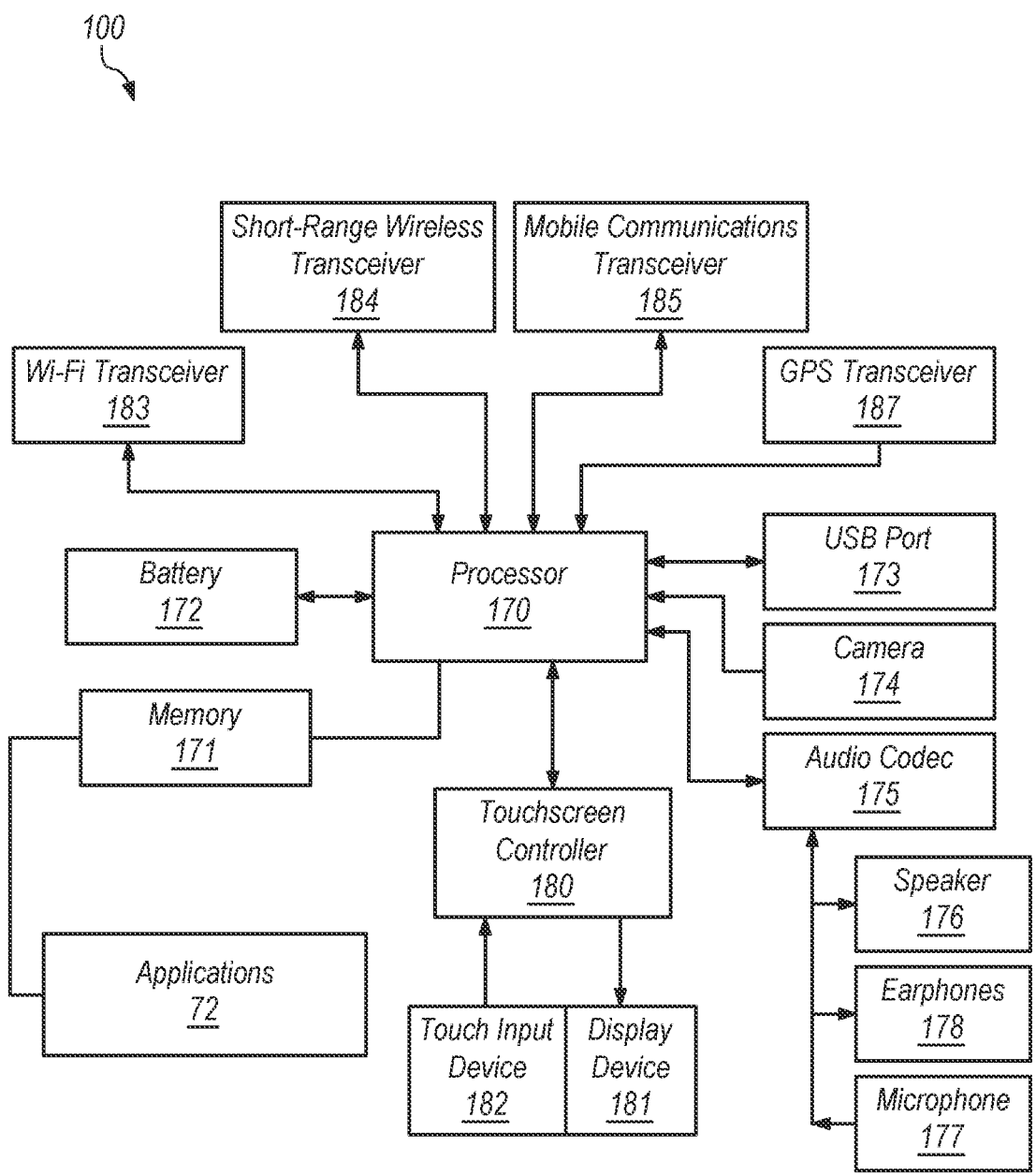
FIG. 6 is a schematic diagram of a computing device, such as a smartphone that may be used as the first party computing device and/or the second party computing device.

FIG. 6 is a schematic diagram of a computing device 100, such as a smartphone that may be used as the first party computing device and/or the second party computing device. The computing device 100 may include a processor 170, memory 171, a battery (or other power source) 172, a universal serial bus (USB) port 173, a camera 174, and an audio codec 175 coupled to a built-in speaker 176, a microphone 177, and an earphone jack 178. The computing device 100 may further include a touchscreen controller 180 which provides a graphical output to the display device 181 and an input from a touch input device 182. Collectively, the display device 181 and touch input device 182 may be referred to as a touchscreen. The computing device 100 may also include a short-range wireless transceiver 184, a wireless local area network transceiver ("Wi-Fi transceiver") 183, a mobile communication transceiver 185 for communication with a cellular communication network, and a global positioning system (GPS) transceiver 187. The memory 171 may store the application 72 as shown in FIG. 5 and perhaps other programs, including program instructions that are executable by the processor 170.

Figure 7:
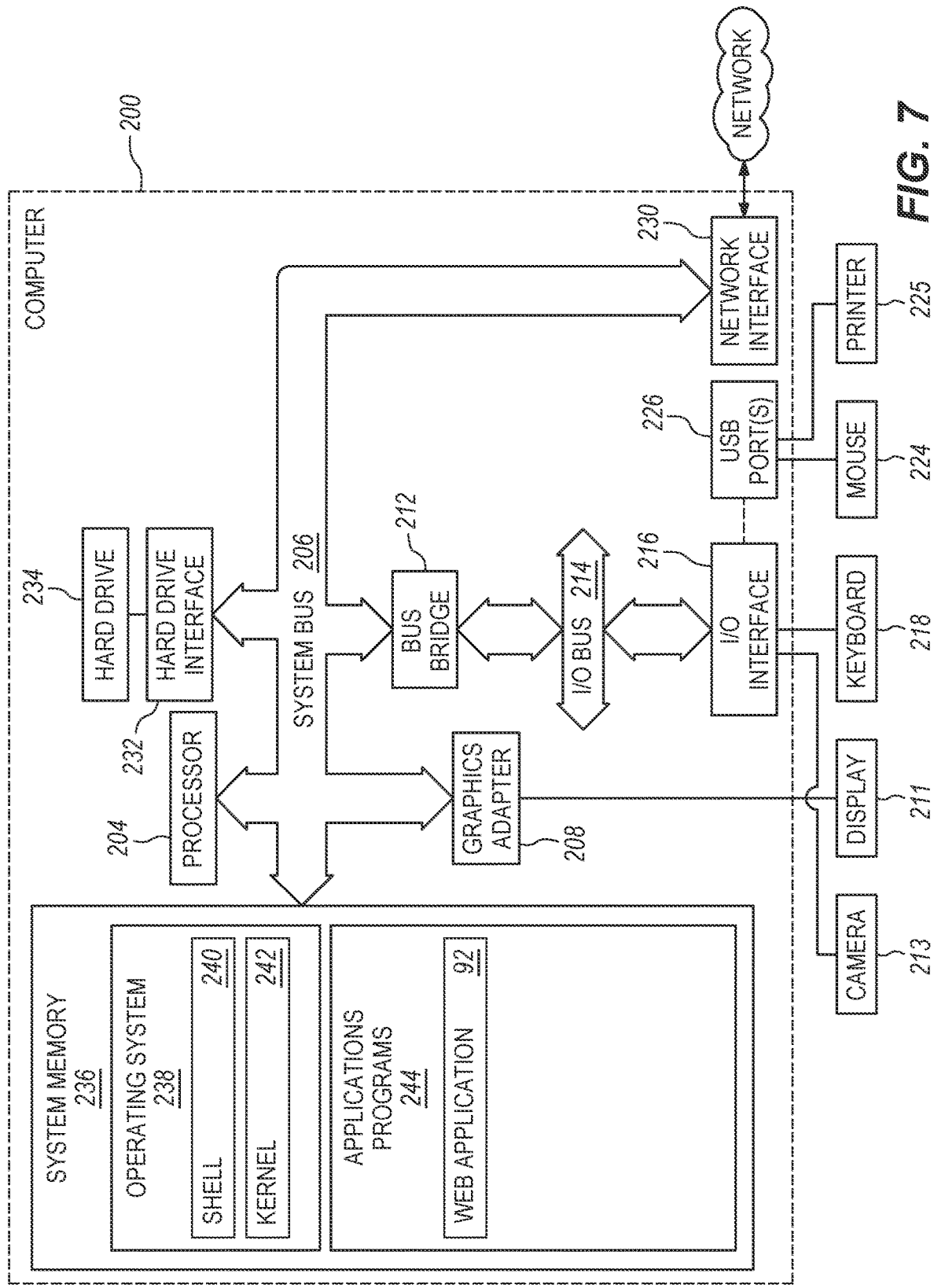
FIG. 7 is a diagram of a computing device that may be representative of the web application server as well as the first party and/or second party computing device.

FIG. 7 is a diagram of a computing device 200 that may be representative of the web application server 90 as well as the first party and/or second party computing devices 70, 80 of FIG. 5. The computer 200 includes a processor unit 204 that is coupled to a system bus 206. The processor unit 204 may utilize one or more processors, each of which has one or more processor cores. A graphics adapter 208, which drives/supports the display 211, is also coupled to system bus 206. The graphics adapter 208 may, for example, include a graphics processing unit (GPU). The system bus 206 is coupled via a bus bridge 212 to an input/output (I/O) bus 214. An I/O interface 216 is coupled to the I/O bus 214. The I/O interface 216 may facilitate communication with various I/O devices, such as a keyboard 218 (such as a touch screen virtual keyboard), a camera 213, a USB mouse 224 via USB port(s) 226 (or other type of pointing device, such as a trackpad), and a USB printer 225 via USB port(s) 226. As depicted, the computer 200 is able to communicate with other network devices over the network 62 using a network adapter or network interface controller 230. For example, the computer 200 may communicate with various computing devices over a network, including a wide area network such as the Internet. Specifically, wherein the computer 200 is the web application server or a cloud computer 90, then the network interface 230 may enable communication with the first party computing device 70 and/or the second party computing device 80 as shown in FIG. 5.

A hard drive interface 232 is also coupled to the system bus 206. The hard drive interface 232 interfaces with a hard drive 234. In some embodiments, the hard drive 234 communicates with system memory 236, which is also coupled to the system bus 206. System memory is defined as a lowest level of volatile memory in the computer 200. This volatile memory includes additional higher levels of volatile memory (not shown), including, but not limited to, cache memory, registers and buffers. Data that populates the system memory 236 includes the operating system (OS) 238 and web application program 92 as shown in FIG. 5. The hardware elements depicted in the computer 200 are not intended to be exhaustive, but rather are representative. For instance, the computer 200 may include non-volatile memory and the like.

The operating system 238 includes a shell 240 for providing transparent user access to resources such as application programs 244. Generally, the shell 240 is a program that provides an interpreter and an interface between the user and the operating system. More specifically, the shell 240 executes commands that are entered into a command line user interface or from a file. Thus, the shell 240, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. Note that while the shell 240 may be a text-based, line-oriented user interface, embodiments may support other user interface modes, such as graphical, voice, gestural, etc.

As depicted, the operating system 238 also includes the kernel 242, which includes lower levels of functionality for the operating system 238, including providing essential services required by other parts of the operating system 238 and application programs 244. Such essential services may include memory management, process and task management, disk management, and mouse and keyboard management. As shown, the computer 200 includes application programs 244 in the system memory of the computer 200, including, without limitation, the web application 92.

Figure 8:
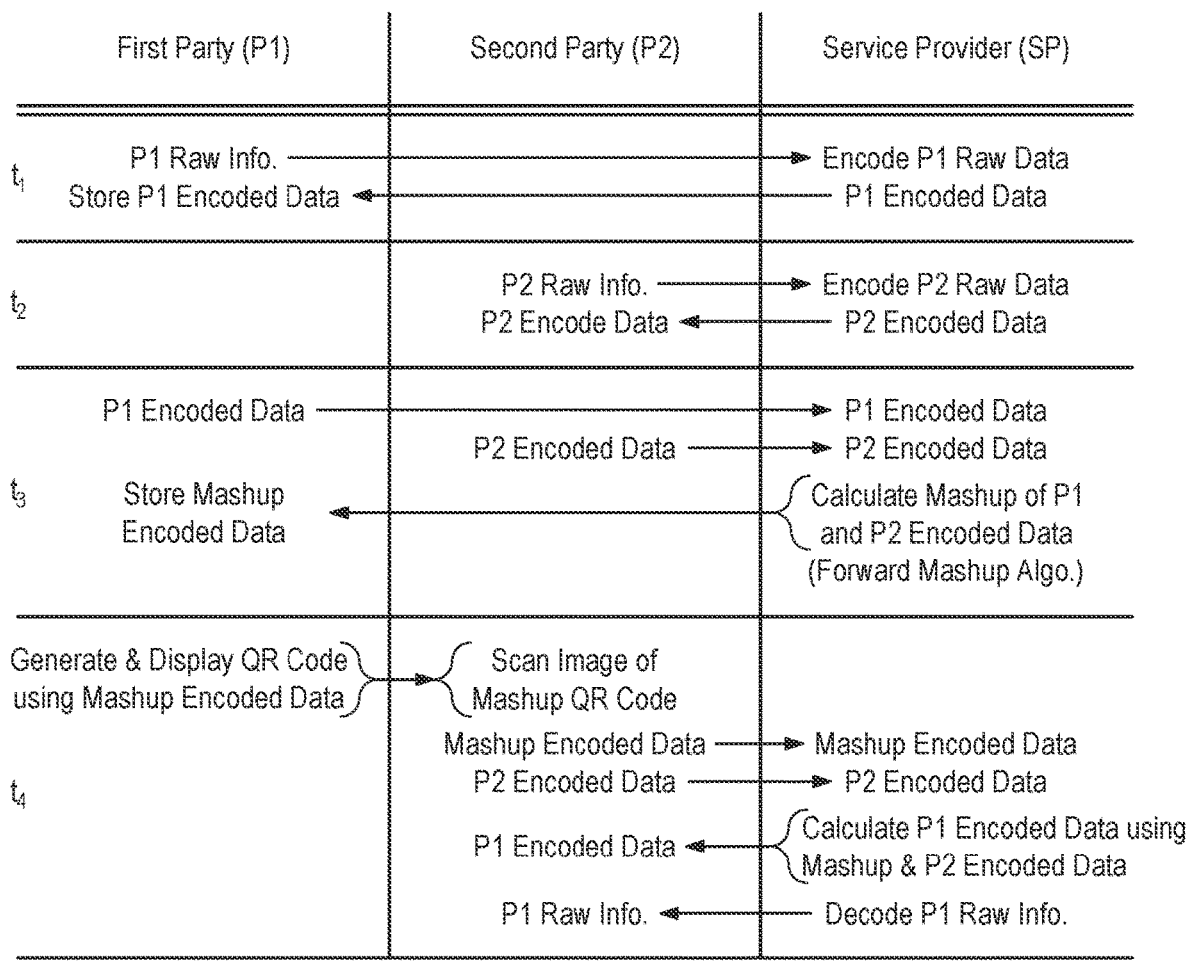
FIG. 8 is a process diagram illustrating interaction between a first party (P1), second party (P2) and service provider (SP) according to a generic example.

FIG. 8 is a process diagram illustrating interaction between a first party (P1), second party (P2) and service provider (SP) according to a generic example. Each entity is given a column in the diagram to identify the operations taken by that entity. Furthermore, the operations are divided up into timeframes $t_1$, $t_2$, $t_3$ and $t_4$. During timeframe $t_1$ the first party submits (see arrow) P1 raw information to the service provider. The service provider encodes the P1 raw data to form P1 encoded data, which is then transferred back to the first party to store the P1 encoded data. During timeframe $t_2$ the second party submits (see arrow) P2 raw information to the service provider. The service provider encodes the P2 raw data to form P2 encoded data, which is then transferred back to the second party to store the P2 encoded data. The operations during timeframes $t_1$ and $t_2$ may be considered initial setup operations, such as each party forming an account with the service provider. During timeframe $t_3$ the first party submits its P1 encoded data to the service provider and the second party submits its P2 encoded data to the service provider. The service provider calculates a forward mashup of P1 and P2 encoded data to form mashup encoded data, which is then transferred to the first party to store the mashup encoded data. During timeframe $t_4$ the first party generates or displays a two-dimensional barcode (QR code) and allows the second party to scan an image of the mashup barcode. The second party may then submit the mashup encoded data and the P2 encoded data to the service provider, and the service provider may calculate P1 encoded data using the reverse mashup algorithm on the mashup encoded data and the P2 encoded data. The service provider may then provide the second party with the P1 encoded data and may optionally also provide the P1 raw information. Note that this process enabled the second party to receive the raw information (possibly, private information) of the first party without the first party displaying their raw information to the second party and without the service provider having to store the raw information. In fact, not even the first party needs to store the raw information for it to be provided to the second party in the manner of FIG. 8.

In addition to the steps or operations shown, it is a technical benefit of some embodiments that the service provider is not required to store the raw information of either the first party or the second party. Rather, the service provider uses the raw information of both the first party and the second party to form the mashup encoded data. Accordingly, at a subsequent time or event, the mashup encoded data and the second party encoded data may be used to decode the first party raw information. In such embodiments, the raw information of the first party, which may be the private information of the first party, is not stored by the service provider or the second party, and optionally may not even be stored by the first party. Therefore, the private information is secured against hacking attempts directed at any of the computing systems of the service provider, first party and second party. The only way to obtain the raw information of the first party is to obtain the mashup encoded data, obtain the second party encoded data, apply the reverse mashup algorithm to mashup encoded data and the second party encoded data to decode the first party encoded data, and then decode the first party encoded data yield the raw information of the first party. In some embodiments, the mashup encoded data and the second party encoded data may be obtained by imaging a mashup two-dimensional barcode (i.e., the optical equivalent of the mashup encoded data) and imaging a second party two-dimensional barcode (i.e., the optical equivalent of the second party encoded data). Importantly, applying the reverse mashup algorithm to a mashup two-dimensional barcode or encoded data and a second party two-dimensional barcode or encoded data will only yield the first party two-dimensional barcode or encoded data if the mashup two-dimensional barcode or encoded data is the same mashup two-dimensional barcode or encoded data that was generated using the forward mashup algorithm on the first party two-dimensional barcode or encoded data and the second party two-dimensional barcode or encoded data.

Figure 9:
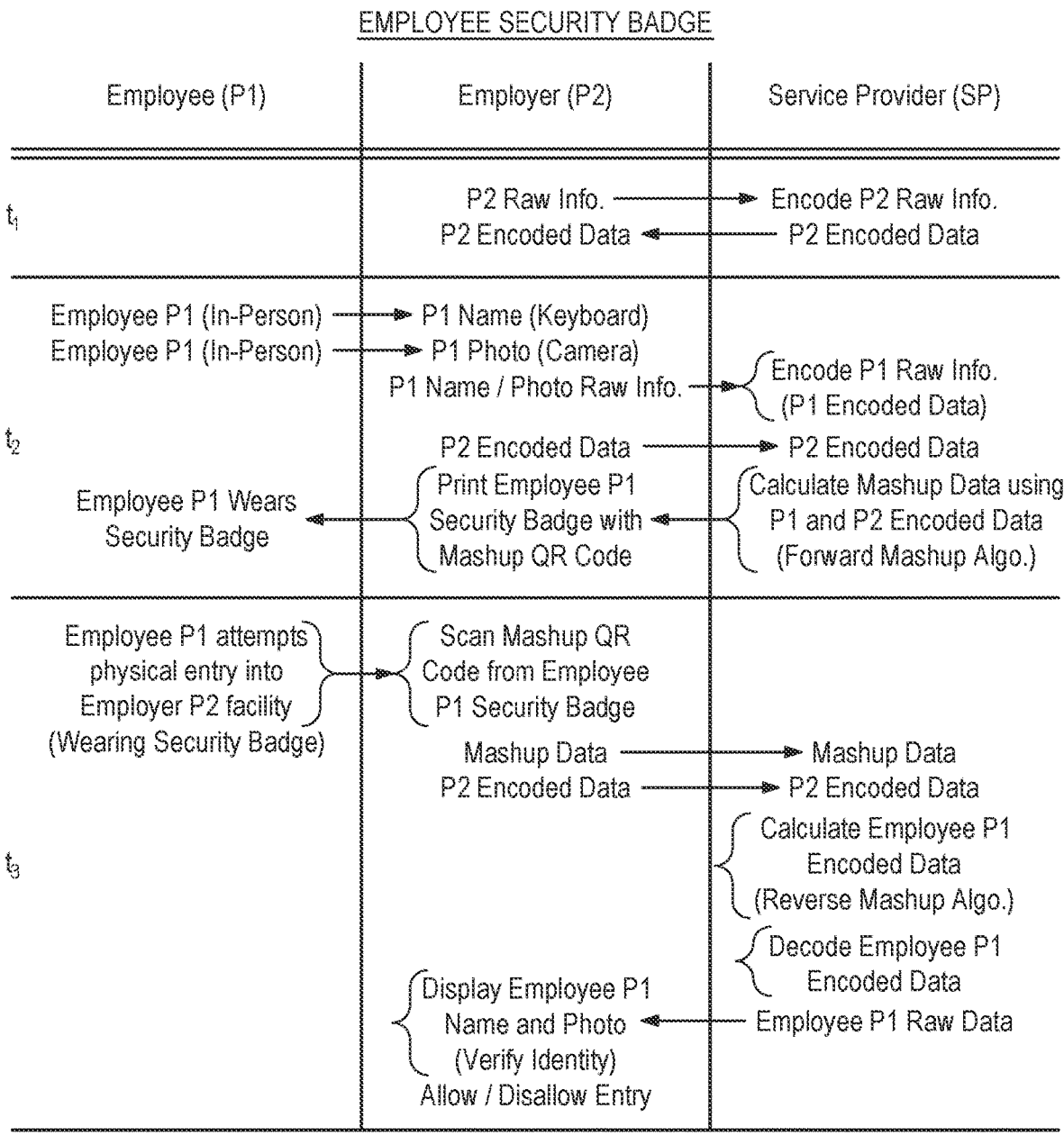
FIG. 9 is a process diagram illustrating interaction between an employee (P1), employer (P2) and service provider (SP) according to a process for generating and using an employee security badge.

FIG. 9 is a process diagram illustrating interaction between an employee (P1), employer (P2) and service provider (SP) according to a process for generating and using an employee security badge. During timeframe $t_1$ the employer (P2) sets up their P2 encoded data as in FIG. 8.

During timeframe $t_2$ the employee (P1) arrives at the employer's facility and allows the employer to take their photo with a camera and input their name via a keyboard into the employer's computer. The employer uses their computer to submit the employees name and photo to the service provider to encode the employee's raw information into P1 encoded data. The employer also submits their own P2 encoded data, such that the service provider may perform the forward mashup algorithm on the P1 and P2 encoded data. The resulting mashup encoded data is provided to the employer (P2), which may print the associated two-dimensional barcode (QR code) onto an employee identification or security badge that is given to the employee (P1) to wear at the employer's facility.

During timeframe $t_3$ the employee wears the security badge while attempting to gain physical entry into the employer's facility. The employer scans the mashup barcode on the employee's security badge, provides the mashup barcode (or underlying encoded data) and the employer's encoded data to the service provider. The service provider then calculates the employee's P1 encoded data using the reverse mashup algorithm, decodes the P1 encoded data to obtain the employee's raw information (name and photo), then transfers the employee's raw information to the employer to verify the identity of the employee. For example, the name and photograph of the employee may be displayed on a security guard's computer display screen. If the displayed name and photograph match the person standing in front of them requesting entry, then the employee's identity is confirmed and the entry is granted. This process occurred without the employee security badge displaying the employee's name or photo, and neither the service provider nor the employer stored the employee's name or photo.

Figure 10:
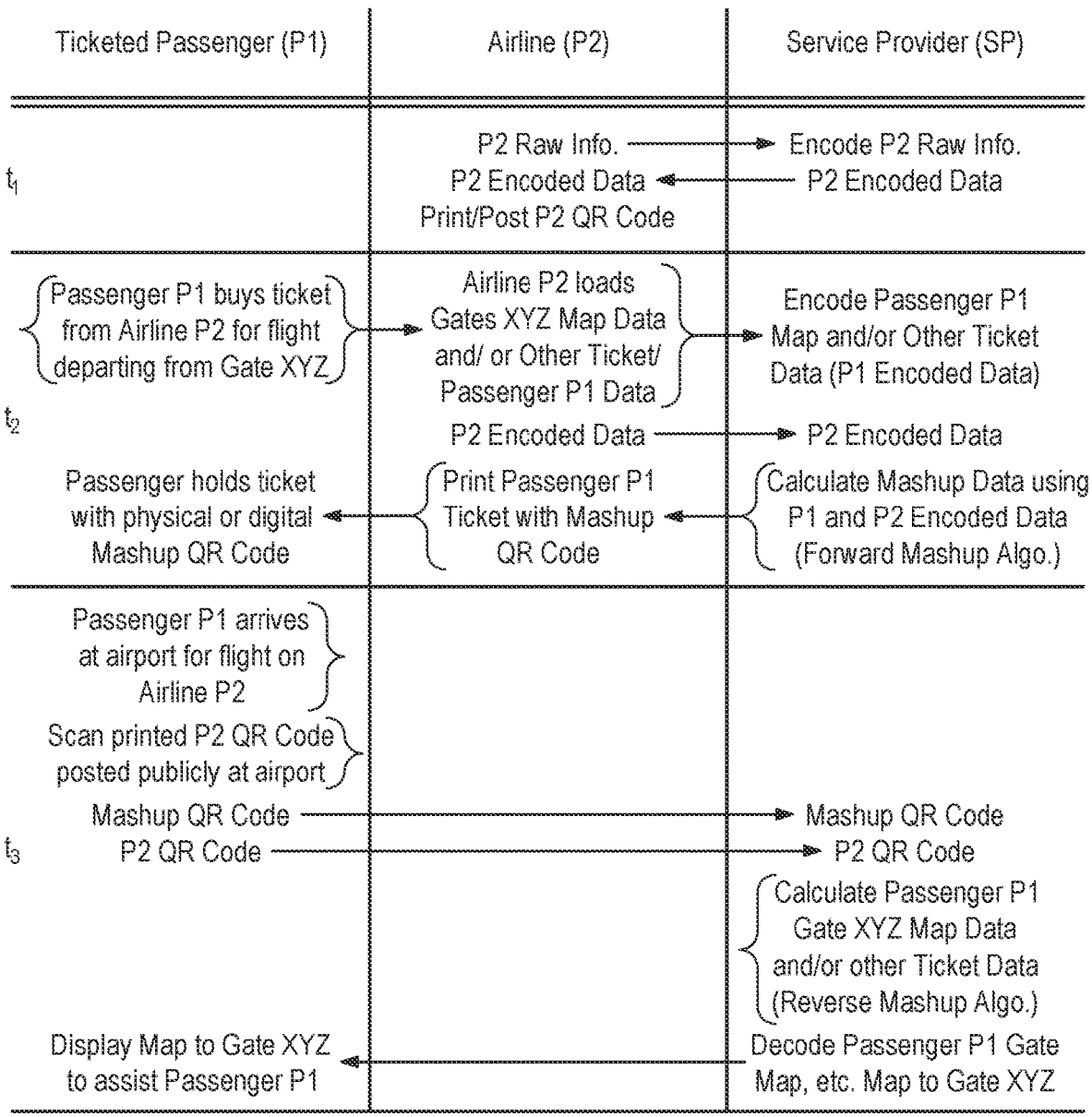
FIG. 10 is a process diagram illustrating interaction between a ticketed passenger (P1), airline (P2) and service provider (SP) according to a process for providing the ticketed passenger with directions and/or map to the terminal and/or gate associated with their flight.

FIG. 10 is a process diagram illustrating interaction between a ticketed passenger (P1), airline (P2) and service provider (SP) according to a process for providing the ticketed passenger with directions and/or map to the terminal and/or gate associated with their flight. During timeframe $t_1$ the airline sets up their P2 encoded data and/or QR code as did the employer in timeframe $t_1$ in FIG. 9.

During timeframe $t_2$ the passenger (P1) buys a ticket from the airline P2 for a flight departing from gate XYZ and provides the airline with P1 raw information, such as a name and driver's license number. The airline provides gate XYZ map data and the airline P2 encoded data to the service provider. The service provider encodes the gate XYZ map data and then uses a forward mashup algorithm on the gate XYZ map encoded data and the P2 encoded data to form mashup encoded data. The mashup encoded data is provide to the airline P2, which prints the associated mashup QR code on the ticket that is provided to the ticketed passenger.

During timeframe $t_3$, such as about two hours before the flight, the ticketed passenger (P1) arrives at the airport and scans the airline's P2 QR code which is posted publicly at the airport as well as the mashup QR code on their ticket. The ticketed passenger uses their mobile device to capture an image of these two QR codes and the application on the mobile device is activated to provide the QR code of the airline and the mashup QR code on the passenger's ticket to the service provider. Upon receipt of these two QR codes, the service provider identifies the underlying mashup encoded data and the airline P2 encoded data, then uses the reverse mashup algorithm to calculate the ticketed passenger P1 gate XYZ encoded data. After decoding the gate XYZ information, the service provider provides the gate XYZ map to the ticketed passenger's mobile computing device for display to the ticketed passenger. Although an airport map is generally public information, the gate map for this particular ticketed passenger is provided without being printed on the ticket and perhaps without any other personal information or ticket data (destination, time or gate number) printed on the ticket.

Figure 11:
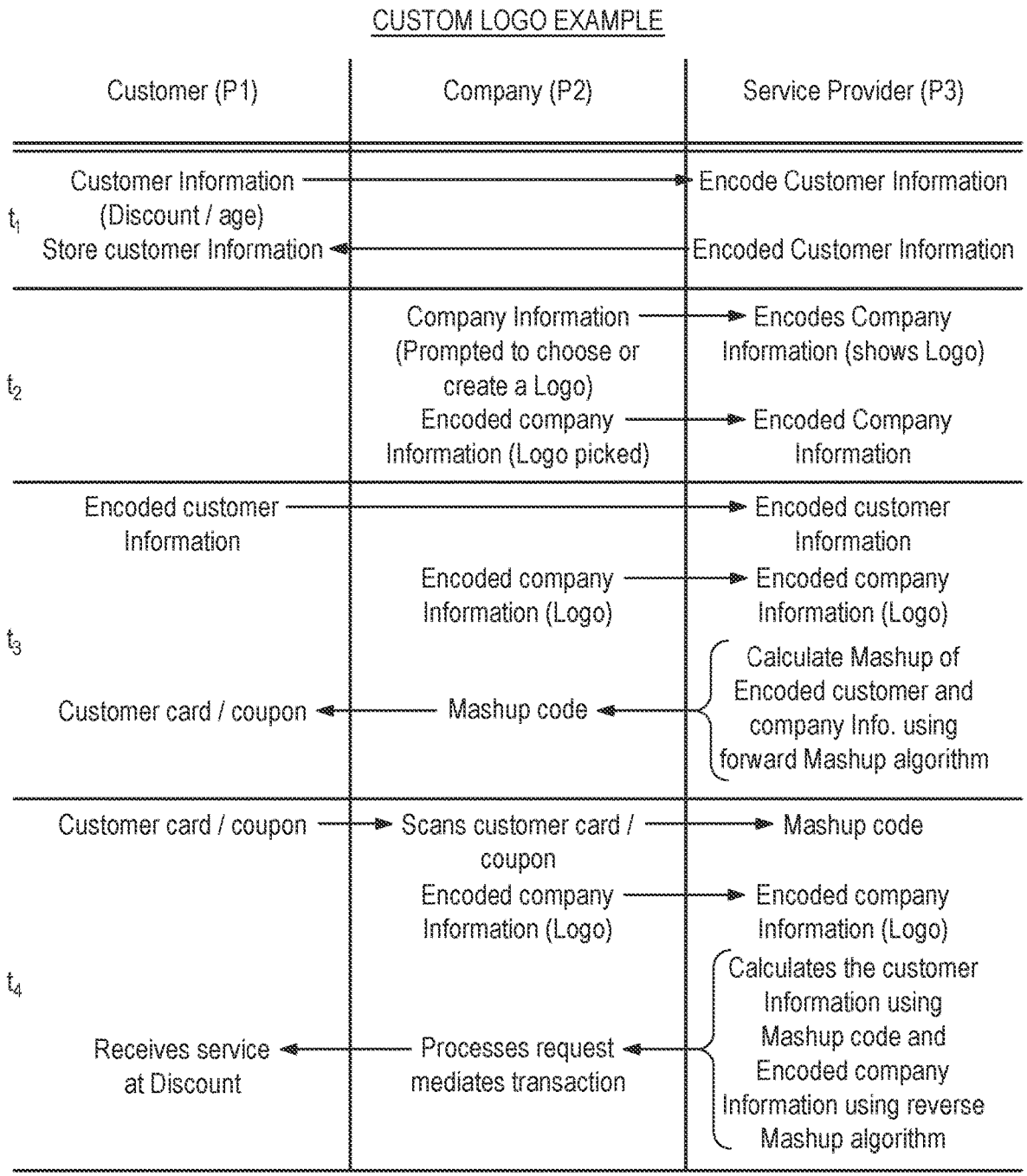
FIG. 11 is a process diagram illustrating the use of a company logo to secure a discount.

FIG. 11 is a process diagram illustrating use of a company logo to secure a discount. The operations during timeframe $t_1$ are similar to those of FIGS. 8-10 during the same timeframe except that the customer P1 raw information may differ, such as including the customer's age that qualifies them for a discount. The operations during timeframe $t_2$ are also similar to those of FIGS. 8-10 during the same timeframe, except that the company provides, chooses or creates a company logo. During timeframe $t_3$, the customer and the company submit their own encoded information, directly or indirectly, to the service provider to form a mashup two-dimensional barcode for the customer using the forward mashup algorithm. In this example, the mashup two-dimensional barcode represents a customer coupon for a discount. During timeframe $t_4$, the customer wants to use the discount to make a purchase from the company. So, during checkout at the company (such as a retail store), the customer presents their discount in the form of the mashup two-dimensional barcode to the company, and the company submits the customer's mashup two-dimensional barcode (or underlying encoded data) and the company's P2 encoded data to the service provider. The service provider processes the P1 and P2 encoded data using the reverse mashup algorithm and passes the resulting customer information (i.e., discount code or coupon) to the company. The company may then complete the checkout process with the customer by applying the customer discount, such that the customer receives the desired goods or services at a discount. Note that the customer's qualifications for the discount (i.e., age), the amount of the discount, or other details of the discount may be encoded into the mashup barcode and are kept private.

FIG. 12 is a process diagram illustrating a credit card transaction. The operations during timeframe $t_1$ are similar to those of FIGS. 8-10 during the same timeframe except that the customer P1 raw information may differ, such as including the customer's bank account number. The operations during timeframe $t_2$ are also similar to those of FIGS. 8-10 during the same timeframe, except that the bank shares their resulting bank encoded data with the retailer P4. During timeframe $t_3$, the customer and the bank submit their own P1 and P2 encoded data, directly or indirectly, to the service provider to form a mashup two-dimensional barcode for the customer using the forward mashup algorithm. The mashup two-dimensional barcode is then provided to the customer for use as a credit/debit card or code. During timeframe $t_4$, the customer wants to use the credit/debit card to make a purchase from the retailer P4. So, during checkout at the retailer, whether online or a physical location, the customer presents their credit/debit card or code in the form of the mashup two-dimensional barcode to the retailer P4, and the retailer P4 submits both the customer's mashup two-dimensional barcode (or underlying customer P1 encoded data) and the bank's P2 encoded data to the service provider. The service provider processes the customer's mashup two-dimensional barcode and the bank's P2 encoded data using the reverse mashup algorithm and passes the resulting customer's bank account information to the bank. The bank may then authorize the transaction and notify the retailer that the transaction has been authorized and/or completed, such that the customer may then receive the desired goods or services. Note that the customer's bank account information may be encoded into the mashup barcode and are kept private from the retailer.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-volatile computer readable medium and non-transitory program instructions embodied therein, the program instructions being configured to be executable by a processor to cause the processor to perform operations comprising:
   obtaining first encoded data that encodes information of a first party;
   obtaining second encoded data that encodes information of a second party;
   performing a forward mashup algorithm on the first encoded data and second encoded data to form a third data set, wherein the forward mashup algorithm performs a bit-wise sequential Boolean operation on the first encoded data and the second encoded data; and
   providing the third data set to the first party as a mashup two-dimensional barcode.

2. The computer program product of claim 1, the operations further comprising:
   providing an image of the mashup two-dimensional barcode by printing the mashup two-dimensional barcode on a surface of an object or displaying the mashup two-dimensional barcode using an electronic display device.

3. The computer program product of claim 1, wherein the second encoded data is obtained by optically scanning a second two-dimensional barcode provided by the second party.

4. The computer program product of claim 1, wherein the processor is included in a web application server or cloud environment.

5. The computer program product of claim 1, wherein the first encoded data includes a first plurality of bits, wherein each bit of the first plurality of bits is associated with a defined position within a first two-dimensional barcode to be formed from the first encoded data;
   wherein the second encoded data includes a second plurality of data bits, wherein each bit of the second plurality is associated with a defined position within a second two-dimensional barcode to be formed from the second encoded data; and
   wherein the bit-wise sequential Boolean operation includes, for each of the defined positions within the two-dimensional barcodes, a Boolean operation performed on the bit of the first encoded data that is associated with the defined position and the bit of the second encoded data that is associated with the defined position.

6. The computer program product of claim 5, wherein the Boolean operation performed by the forward mashup algorithm is a logical AND operation.

7. The computer program product of claim 5, wherein, for each of the plurality of bits in the first encoded data, the value of the bit determines whether a black or white area is provided at the defined position associated with the bit.

8. The computer program product of claim 5, wherein the first and second two-dimensional barcodes include defined positions arranged in columns and rows.

9. The computer program product of claim 8, the operations further comprising:
    identifying one or more orientation feature within the image of the first two-dimensional barcode that indicates an orientation of the first two-dimensional barcode; and
    identifying one or more orientation feature within the image of the second two-dimensional barcode that indicates an orientation of the second two-dimensional barcode, wherein the defined positions within the first and second two-dimensional barcodes are identified relative to the one or more orientation features.

10. The computer program product of claim 5, wherein the Boolean operation performed by the forward mashup algorithm is a logical XOR operation.

11. The computer program product of claim 1, wherein the first encoded data encodes information of the first party using an encoding standard selected from a character encoding standard and an image coding format.

12. The computer program product of claim 1, the operations further comprising:
    receiving, subsequent to providing the third data set to the first party as the mashup two-dimensional barcode, the third data set from a computing device operated by a retailer, wherein the first party is a customer, the first party information includes an account identifier, and the second party is a bank;
    receiving the second encoded data from the retailer;
    performing a reverse mashup algorithm on the third data set and the second encoded data to determine the first encoded data;
    decoding the first encoded data to produce the account identifier of the first party; and
    outputting the account identifier of the first party to the computing device of the retailer.

13. The computer program product of claim 1, the operations further comprising:
    receiving, subsequent to providing the third data set to the first party as the mashup two-dimensional barcode, the third data set from a computing device operated by the second party;
    performing a reverse mashup algorithm on the third data set and the second encoded data to determine the first encoded data;
    decoding the first encoded data to produce the information of the first party; and
    outputting the information of the first party to the computing device of the second party, wherein the forward mashup algorithm is a first Boolean operation and the reverse mashup algorithm is a second Boolean operation.

14. The computer program product of claim 1, wherein the information of the first party and/or the information of the second party includes alphanumeric text, an image, audio, and/or video.

15. The computer program product of claim 1, wherein the information of the first party and/or the information of the second party includes bank account information, real time data, global positioning system (GPS) data, and/or stock numbers.

16. The computer program product of claim 1, wherein the mashup two-dimensional barcode does not encode useful information.

17. The computer program product of claim 1, wherein the forward mashup algorithm is included in a forward and reverse mashup algorithm pair selected by the first party or the second party from multiple paired forward and reverse mashup algorithms.

18. The computer program product of claim 1, wherein the mashup two-dimensional barcode includes a mashup bit identifying that the barcode is a mashup two-dimensional barcode.

19. The computer program product of claim 1, wherein the first encoded data is a subset of a first two-dimensional barcode, the second encoded data is a subset of a second two-dimensional barcode, and the third data set is a subset of the mashup two-dimensional barcode.

20. The computer program product of claim 19, wherein the forward mashup algorithm is not performed on orientation squares and/or encoding information.

21. A computer program product comprising a non-volatile computer readable medium and non-transitory program instructions embodied therein, the program instructions being configured to be executable by a processor to cause the processor to perform operations comprising:
    obtaining first encoded data that encodes information of a first party;
    obtaining second encoded data that encodes information of a second party;
    performing a forward mashup algorithm on the first encoded data and second encoded data to form a third data set;
    providing the third data set to the first party as a mashup two-dimensional barcode;
    receiving, subsequent to providing the third data set to the first party as the mashup two-dimensional barcode, the third data set from a computing device operated by the second party;
    performing a reverse mashup algorithm on the third data set and the second encoded data to determine the first encoded data;
    decoding the first encoded data to produce private the information of the first party; and
    outputting the private information of the first party to the computing device of the second party.

22. The computer program product of claim 21, wherein the forward mashup algorithm is a first Boolean operation and the reverse mashup algorithm is a second Boolean operation.

23. The computer program product of claim 21, the operations further comprising:
    providing an image of the mashup two-dimensional barcode by printing the mashup two-dimensional barcode on an identification card or badge to be given to the first party;
    receiving an image of the mashup two-dimensional barcode that is printed on the identification card or badge from the computing device of the second party; and
    decoding the third data set from the mashup two-dimensional barcode.

24. The computer program product of claim 23, wherein the image of the mashup two-dimensional barcode that is printed on the identification card or badge is received from the computing device of the second party.

25. The computer program product of claim 23, wherein the processor is included in a computing device of the second party, wherein the computing device of the second party receives the image of the mashup two-dimensional barcode from a digital camera directly attached to the computing device of the second party, and wherein the private information of the first party is output to a display screen directly attached to the computing device of the second party.

26. The computer program product of claim 21, wherein the information of the first party includes a name, identification number, and/or photograph of the first party.

27. The computer program product of claim 21, the operations further comprising:
receiving input from the first party or the second party indicating whether to perform the forward mashup algorithm to form the third data set or perform the reverse mashup algorithm to determine the first encoded data.

28. A computer program product comprising a non-volatile computer readable medium and non-transitory program instructions embodied therein, the program instructions being configured to be executable by a processor to cause the processor to perform operations comprising:
obtaining first encoded data that encodes information of a first party;
obtaining second encoded data that encodes information of a second party;
performing a forward mashup algorithm on the first encoded data and second encoded data to form a third data set;
providing the third data set to the first party as a mashup two-dimensional barcode;
confirming that the computing device of the first party has received the mashup two-dimensional barcode; and
deleting any record of the information of the first party and the first encoded data from memory or data storage attached to the processor.

29. The computer program product of claim 28, wherein the processor is included in a web application server or cloud environment.

30. The computer program product of claim 28, wherein the operations are performed by a service provider that is neither the first party nor the second party.

31. An apparatus, comprising:
at least one non-volatile storage device storing program instructions; and
at least one processor configured to process the program instructions, wherein the program instructions are configured to, when processed by the at least one processor, cause the apparatus to perform operations comprising:
obtaining first encoded data that encodes information of a first party;
obtaining second encoded data that encodes information of a second party;
performing a forward mashup algorithm on the first encoded data and second encoded data to form a third data set, wherein the forward mashup algorithm performs a bit-wise sequential Boolean operation on the first encoded data and the second encoded data; and
providing the third data set to the first party as a mashup two-dimensional barcode.

32. The apparatus of claim 31, wherein the processor is included in a web application server or cloud environment.

* * * * *